(12) United States Patent
Jain et al.

(10) Patent No.: US 11,102,617 B2
(45) Date of Patent: Aug. 24, 2021

(54) INDOOR NAVIGATION AND TRACKING WITH MESH NETWORK (71) Applicant: STMicroelectronics International N.V., Geneva (CH)

(72) Inventors: Jitendra Jain, Firozabad (IN); Alok Kumar Mittal, Noida (IN)

(73) Assignee: STMicroelectronics International N.V., Geneva (CH)

(*) Notice: Subject to any disclaimer, the term of this patent is extended or adjusted under 35 U.S.C. 154(b) by 0 days.

(21) Appl. No.: 16/743,854

(22) Filed: Jan. 15, 2020

(65) Prior Publication Data
US 2021/0219097 A1  Jul. 15, 2021

(51) Int. Cl.
H04W 4/029 (2018.01)
H04W 4/33 (2018.01)
H04W 84/18 (2009.01)

(52) U.S. Cl.
CPC ............. *H04W 4/029* (2018.02); *H04W 4/33* (2018.02); *H04W 84/18* (2013.01)

(58) Field of Classification Search
CPC ....... H04W 4/00–029; H04W 4/30–38; H04W 92/08; H04W 92/16; H04W 92/18; H04W 84/18; H04W 88/02–06
See application file for complete search history.

(56) References Cited

U.S. PATENT DOCUMENTS

| | | | |
|---|---|---|---|
| 7,095,319 B2 * | 8/2006 | Izumi | G01S 5/0252 340/539.11 |
| 7,602,338 B2 | 10/2009 | Smith et al. | |
| 7,701,334 B1 | 4/2010 | Perkins et al. | |
| 8,026,814 B1 | 9/2011 | Heinze et al. | |
| 9,204,257 B1 * | 12/2015 | Mendelson | G07B 15/00 |
| 9,510,149 B2 | 11/2016 | Kiskani et al. | |
| 10,210,353 B1 | 2/2019 | Li et al. | |
| 10,422,848 B1 | 9/2019 | Li et al. | |
| 2003/0035387 A1 * | 2/2003 | Kim | H04L 61/1511 370/328 |
| 2005/0190717 A1 * | 9/2005 | Shu | H04L 45/00 370/328 |
| 2008/0137556 A1 * | 6/2008 | Park | H04L 29/1232 370/255 |

(Continued)

FOREIGN PATENT DOCUMENTS

WO  2012154153 A1  11/2012

*Primary Examiner* — San Htun
(74) *Attorney, Agent, or Firm* — Slater Matsil, LLP (57) ABSTRACT This application discloses systems, devices, and methods for indoor navigation and tracking with a mesh network. In one aspect, a navigation device includes a receiver configured to receive a locational signal from a node network. The locational signal identifies a respective node of the node network, and the node network is distributed throughout a physical space. The navigation device includes a memory storing a program and a processor in communication with the receiver and configured to execute the program to calculate a position of the navigation device from the identity of the respective node, determine a routing instruction from the position of the navigation device to a destination based on the position of the navigation device and a known mapping of the node network in the physical space, and update the position of the navigation device and the routing instruction as the navigation device moves through the physical space.

21 Claims, 7 Drawing Sheets (56) References Cited

U.S. PATENT DOCUMENTS

| | | | | |
|---|---|---|---|---|
| 2009/0003243 A1* | 1/2009 | Vaswani | ............ | H04L 41/0806 370/255 |
| 2009/0088182 A1* | 4/2009 | Piersol | ................. | H04W 48/12 455/456.1 |
| 2014/0024354 A1* | 1/2014 | Haik | ..................... | G01C 21/20 455/418 |

\* cited by examiner

INDOOR NAVIGATION AND TRACKING WITH MESH NETWORK

TECHNICAL FIELD

The present invention relates generally to systems and methods for navigation and tracking, and, in particular embodiments, to indoor navigation and tracking with a mesh network.

BACKGROUND

While global positioning system (GPS) is good at providing location information while outdoors, indoor navigation and tracking is not possible using GPS because of the shielding of GPS signals by large buildings. This is also true in many cases with tracking or navigation systems based on signals received and transmitted utilizing mobile networks. Signals cannot easily penetrate malls, stadiums, schools, or other indoor facilities. This can hamper efforts to track/navigate within those spaces or adversely impact tracking or navigation accuracy. The same can be said for any location where signal transmissions are obscured or blocked.

There are many places where indoor navigation/tracking is desirable and improvements in indoor tracking/navigation devices are desirable. Accurate navigation within supermarkets and shopping complexes may help consumers locate stores, sections, or even items. Tracking within these same facilities may help businesses collect data about shopping habits, locating inventory, employees, or customers. Navigation within airports can help travelers find a desired gate, bathroom, or other location within an airport. Tracking can be used to locate lost equipment or people. There are many instances where indoor tracking can be applicable, for example, in regular use, for helping inaccessible persons in case of emergency or calamities. Factories can benefit to track workers and used by workers to locate equipment.

SUMMARY

In accordance with an embodiment of the present invention, a navigation system includes a node network that includes a plurality of nodes distributed throughout a physical space. The plurality of nodes is configured to emit a plurality of locational signals from a plurality of emitting nodes, where the plurality of locational signals identifies the plurality of nodes. The navigation system further includes a map of the physical space including the locations of the plurality of nodes. The navigation system further includes a navigation device that includes a receiver configured to receive a locational signal transmitted by a respective emitting node of the plurality of nodes in a communication range of the navigation device. The navigation device further includes a memory storing a program and a processor in communication with the receiver and configured to execute the program to access the map of the physical space, calculate a position of the navigation device in the physical space from the locational signal received by the navigation device, and determine a routing instruction from the position of the navigation device to a destination based on the position of the navigation device and the mapping of the physical space.

In accordance with an embodiment of the present invention, a system for tracking a device in a physical space includes a tracking device disposed at a position in the physical space. The tracking device includes a transmitter configured to transmit a beacon signal that identifies the tracking device. The system includes a node network including a plurality of nodes, where the nodes of the plurality of nodes are configured to receive the beacon signal when in a communication range of the tracking device. The system also includes a map of the physical space including locations of the nodes of the plurality of nodes. The tracking device further includes a memory storing a program and a processor in communication with the node network and the memory. The processor is configured to execute the program to identify the position of the tracking device by retrieving data transmissions from the plurality of nodes that indicate when the nodes of the plurality of nodes are in the range of the tracking device.

In accordance with an embodiment of the present invention, a method for navigation within a physical space includes emitting locational signals from a node network distributed throughout a physical space, where the locational signals identify the nodes of the node network. The method further includes receiving one of the locational signals at a navigation device emitted from a node of the node network in a communication range of the navigation device. The method further includes calculating a spatial position of the navigational device from an identity of the node of the node network in the communication range of the navigation device. The method further includes determining a routing instruction from the position of the navigational device to a selected destination in the physical space.

In accordance with an embodiment of the present invention, a method for tracking a device within a physical space includes mapping a node network within the physical space; emitting a beacon signal from a tracking device at a location in the physical space; receiving the beacon signal at a plurality of nodes of the node network in a communication range of the tracking device; communicating an identity of the nodes in the communication range of the tracking device to a processor; and determining a spatial position of the tracking device by the processor from the identity of the nodes in the range of the tracking device.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Conventional ideas for tracking/navigation indoors or in obscured locations involve beacon technologies to help track people using dedicated scanners and beacon generators. The fixed location of such beacons and scanners help to locate and navigate. However, such dedicated scanners are of limited use when dealing with new locations or addressing a large population effectively.

Currently, there is no known standard available for indoor navigation/tracking. But, one system for navigation/tracking indoors and in obscured places may utilize a node network to transmit and receive signals. The nodes themselves may be located indoors or in obscured areas where signals in other technologies have difficulty penetrating. And, nodes may be easily added, removed, or moved through the system.

One such system may utilize mesh networking. Mesh networking of appliances is an emerging technology. More and more buildings and social places will have mesh networks comprising a wide variety of lights, sensors, displays, equipment, machinery and appliances configured to operate as a node of the network.

Using mesh networking allows data to travel along multiple pathways between any two nodes along routes from any of the other nodes in the network. This can reduce the reliance of the system on any central routing unit or units. Plus, the presence of nodes that can generate and receive signals inside a mall, shopping center or other facility allows signals to penetrate areas with otherwise limited accessibility. It, also, is not necessary to have such a network connected to outside systems. In other words, mesh networks can be self-contained, which can be desirable for security purposes.

Bluetooth Mesh is one type of mesh networking and is a wireless standard. Its primary application is in smart buildings. It features many to many nodes connectivity where all nodes are reachable from any other node. There is no limit to the number of mesh nodes present in a Bluetooth Mesh network. A Bluetooth Mesh controlled smart building would have hundreds or thousands of mesh nodes catering to different applications such as smart lights: lights in corridors, wash rooms, shops, supermarkets; sensor nodes: temperature sensors, environmental sensors; smart switches: switches to control lights in their vicinity like normal switches; smart equipment: HVAC, smart plug, smart regulators; and emergency nodes. Other equipment and appliances like coffee makers, crock pots, blenders, televisions, monitors and virtually any electronic device may be a Bluetooth Mesh enabled node. Bluetooth Mesh has multi-layer and multi-application configurable security levels to address different scenarios and known security challenges. Bluetooth Mesh provides flexibility to users, which makes it a leading choice for smart home/smart building applications where high data throughput is not necessarily a priority.

With Bluetooth Mesh gaining popularity around the world and expected to reach billions of nodes, Applicant proposes to address indoor navigation and tracking using mesh technologies such as Bluetooth Mesh in a cost effective manner. It should be noted that the applications of the present invention are not limited to Bluetooth Mesh networks.

Figure 2:
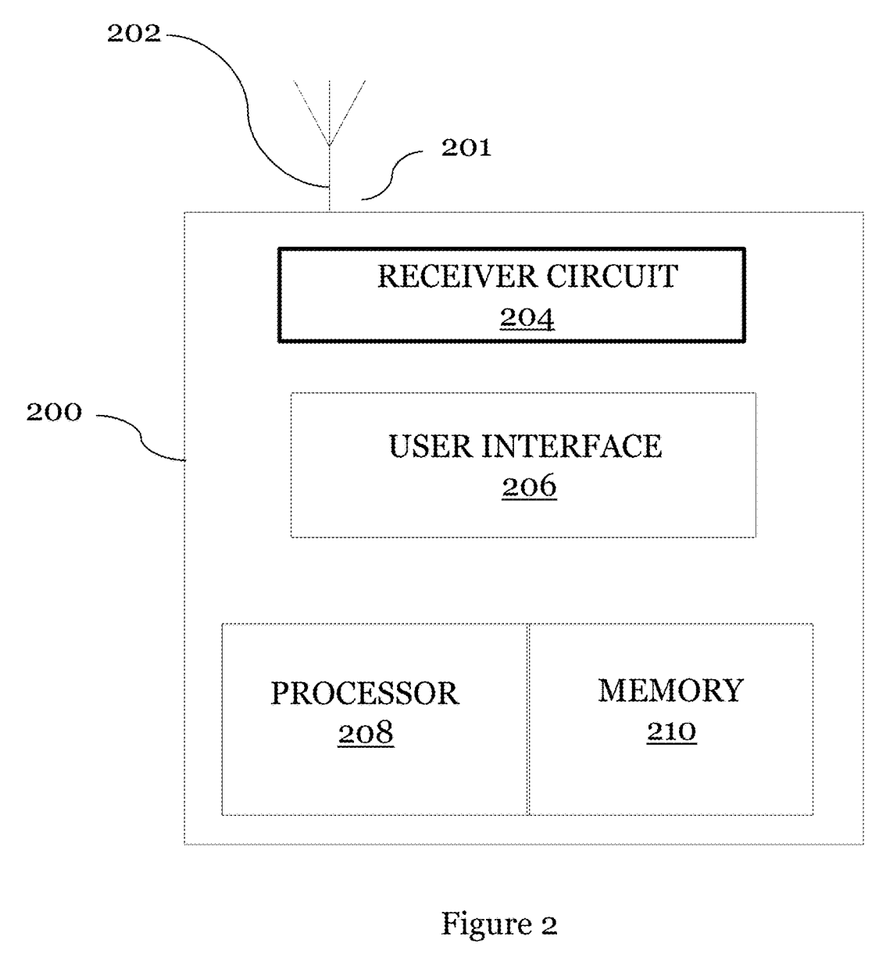
FIG. 2 illustrates a diagram of an embodiment of a navigation device.
Figure 3:
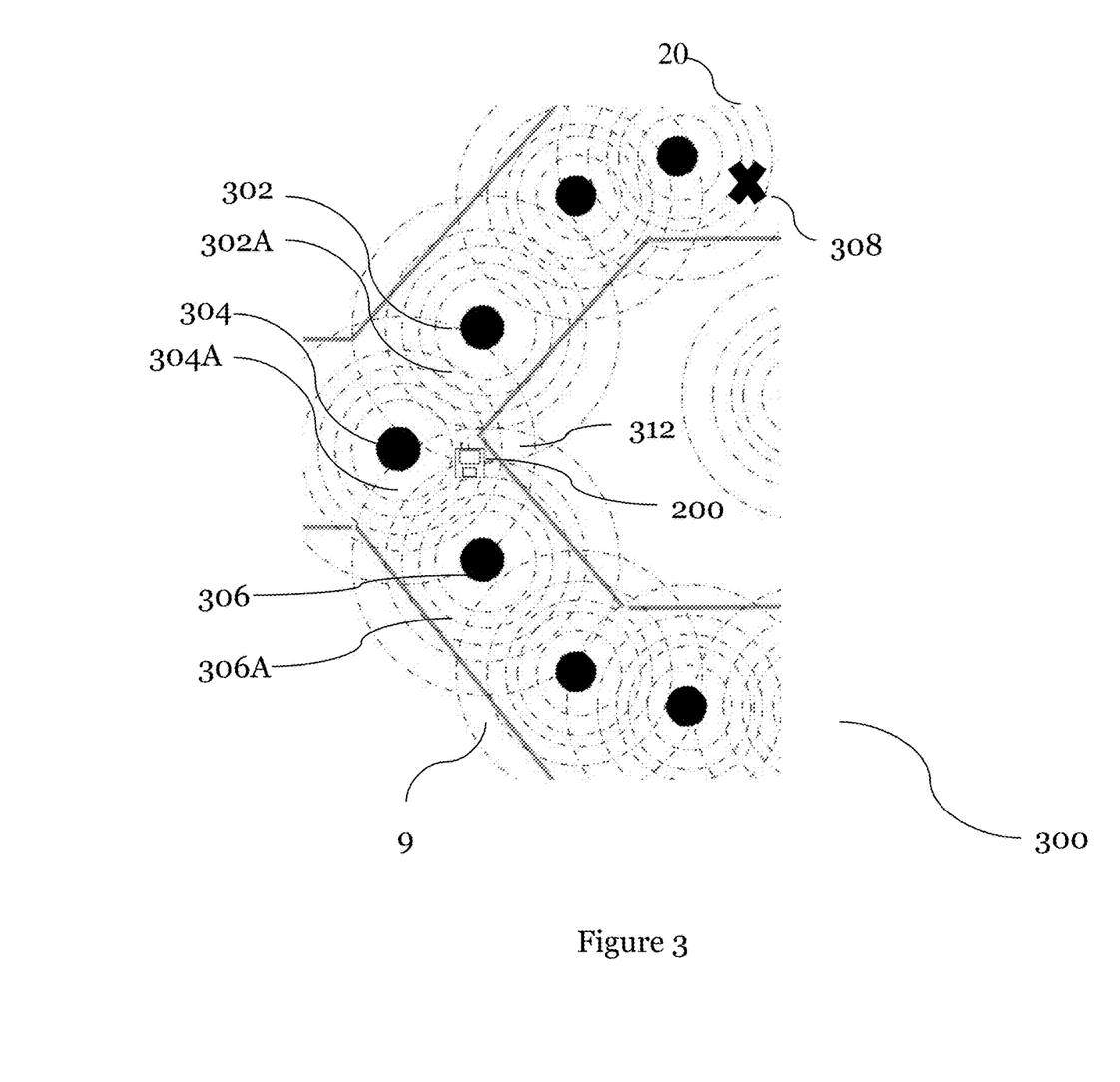
FIG. 3 illustrates a diagram of an embodiment of a navigation system.
Figure 4:
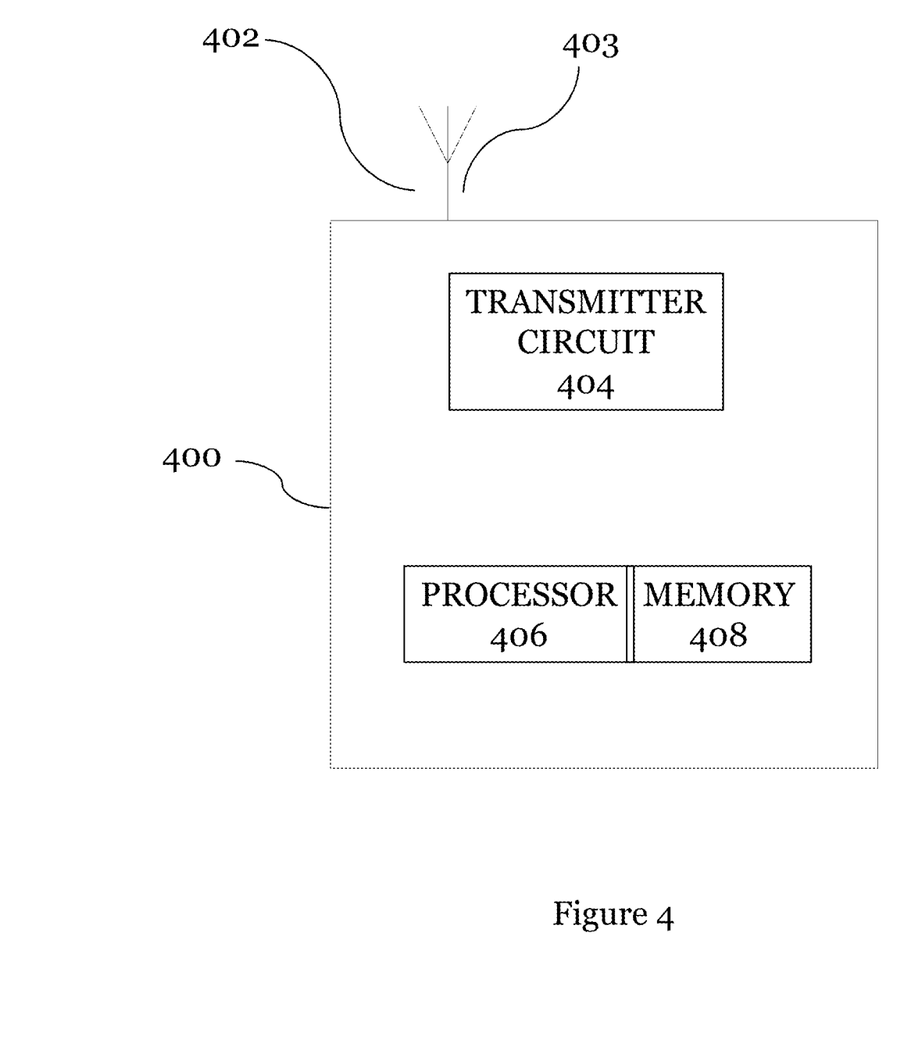
FIG. 4 illustrates an embodiment of a tracking device.
Figure 5:
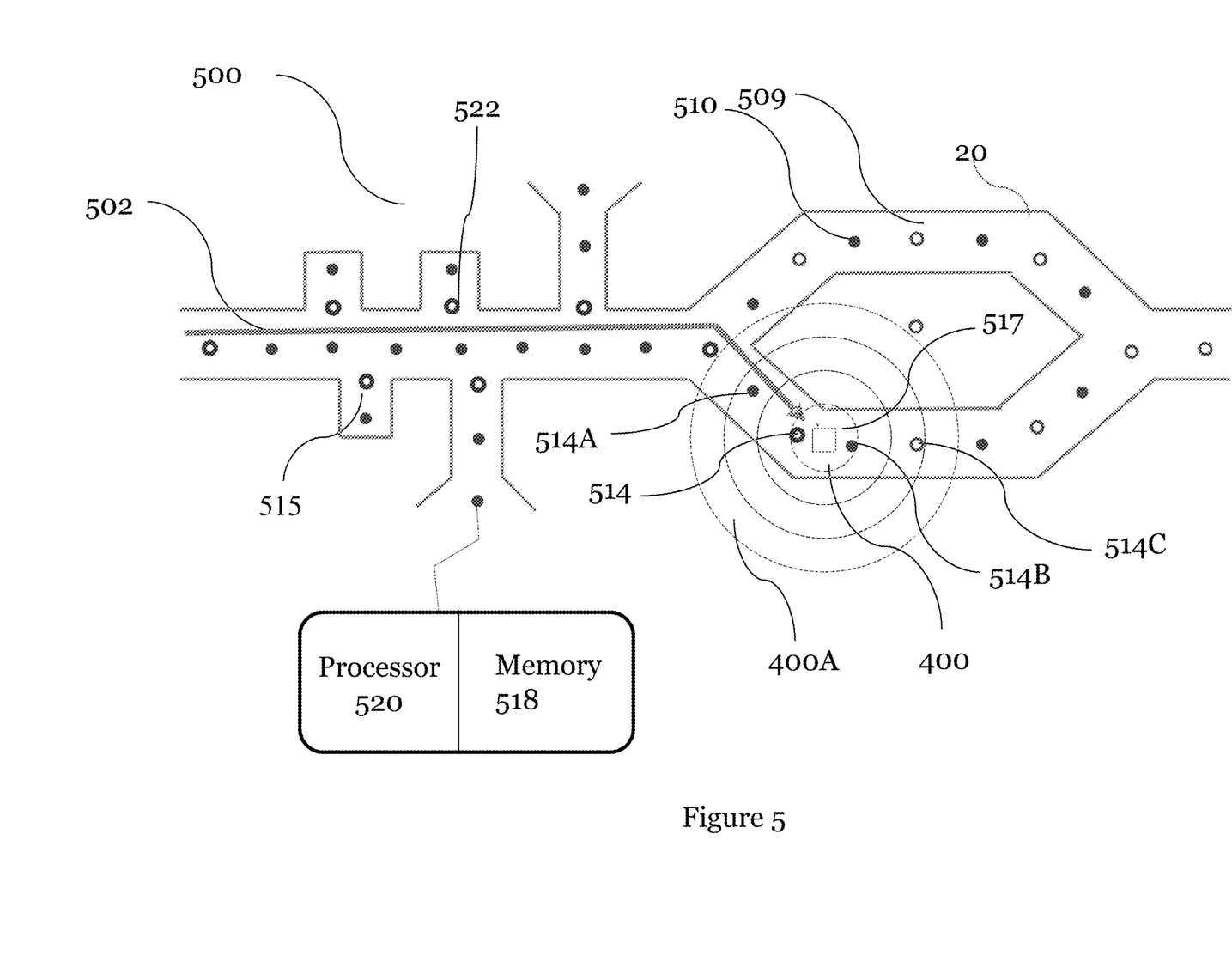
FIG. 5 illustrates a diagram of an embodiment of a tracking system.

Embodiments of the present application disclose devices, systems and methods for tracking and navigation within a physical space. An embodiment node network that can be used for tracking and navigation will be described in FIG. 1. FIGS. 2 and 3 further describe embodiments of the navigation device and navigation system. FIGS. 4-5 further describe embodiments of the tracking device and tracking system. A tracking method will be described using FIG. 6 while a navigational method will be described using FIG. 7.

Figure 1:
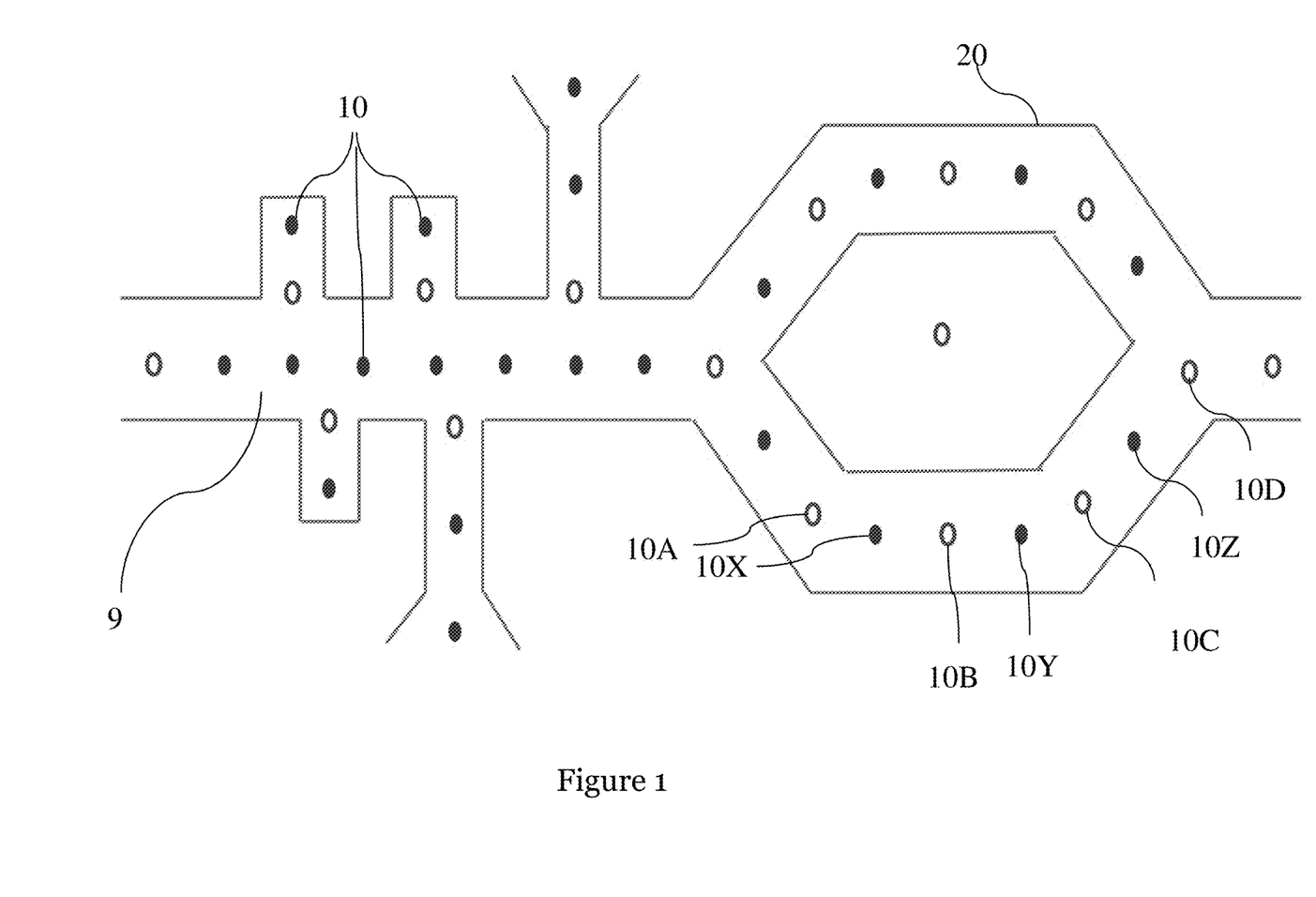
FIG. 1 illustrates a diagram of a node network.

FIG. 1 illustrates an embodiment of a node network 9 in a physical space 20 that is in the interior of a building, warehouse, mall, or other structure. In various embodiments, the node network 9 is distributed throughout the physical space 20. It should also be appreciated that in embodiments the node network 9 may not be confined to an interior space. For example, a node network 9 may be located on a street, a town, a park, campus, on a ship, or a backyard. The node network 9 may be partially indoors and partially outdoors. The physical space 20 may also comprise a physical space 20 located on multiple floors of a structure or multiple rooms. The node network 11 may be located in any place where the nodes may be placed.

The node network 9 comprises a plurality of nodes 10. The nodes of the plurality of nodes 10 may comprise different forms in different embodiments. Nodes may be smart devices like smart switches, or smart appliances. Nodes can also be sensors, cameras, mobile devices, wearable buttons or tokens, or dedicated nodes. Virtually any electronic device can also be configured to be a node of the node network 9. In some embodiments, a single device may comprise the plurality of nodes 10.

In embodiments, the node network 9 may comprise a variety of different types of nodes. Some of the plurality of nodes 10 of the node network 9 may be switches, some of the plurality of nodes 10 of the node network 9 may be lights, some of the plurality of nodes 10 of the node network 9 may be sensors, and some of the plurality of nodes 10 of the node network 9 may be smart appliances. The node network 9 may comprise any combination of different types of nodes. In some embodiments, nodes 10 of the node network 9 are configured for node to node communication.

The node network 9 may comprise a mesh network in one example embodiment. In some embodiments, each node in the node network 9 may be configured to relay transmissions to and from the other nodes in the node network 9 that are in range of the transmitting nodes. In this way, data signals may be relayed from any one of the nodes 10 in the network to any or all the other nodes in the node network 9. Messages and, or, signals may be relayed in the node network 9 by a flooding or managed flooding. In various embodiments, the node network 9 may be configured for many to many communications between the nodes of the node network 9. Data from any node in the node network 9 may also be accessed from any other point in the network. In some embodiments, the node network 9 comprises a Bluetooth Mesh network.

In some embodiments, the nodes of the node network 9 may also be addressable so that data transmissions can be relayed through the node network 9 to them. For example, a data transmission may be addressed to node 10D of the plurality of nodes 10. In embodiments, node 10D may comprise a smart locking device. A message relayed through the node network 9 may direct node 10D to lock. The message may be addressed to node 10D individually so that node 10D will implement the direction to lock but no other nodes.

In some embodiments, the nodes of the plurality of nodes 10 may be addressable as a subgroup of the plurality of nodes 10. For example, nodes 10A, 10B, 10C and 10D may comprise smart locks in some embodiments. A message may be directed to all locks in the node network 9 to become unlocked. Nodes 10A, 10B, 10C and 10D will receive the message and follow the command while other nodes of the node network will not follow the command. The plurality of nodes 10 can be divided into any manner of groups in different embodiments depending on the needs of the node network 9.

In some embodiments, a subset of nodes of the plurality of nodes 10 is configured to relay or transmit data. Relay nodes may receive data and transmit data to other nodes of the plurality of nodes 10. While other nodes, may only transmit data. In an embodiment, nodes 10A, 10B, 10C and 10D comprise relay nodes whereas nodes 10X, 10Y, and 10Z do not. This can be advantageous in some embodiments for reducing the power requirements of the node network 9 while still allowing communication between all the nodes of the network. Any of the nodes of the node network 9 may comprise relay nodes in different embodiments. And, in some embodiments, all nodes of the node network 9 may comprise relay nodes. In some embodiments, non-relaying or non-transmitting nodes may comprise Bluetooth Low Energy devices.

In various embodiments, messages or signals relayed between the nodes 10 may comprise a time to live ("TIL") indicator or value. The time to live indicator may limit the dissemination of data through the network. Messages may be initialized with a given TTL. After the message is relayed to another node, the TTL is decremented. Messages with a value below a given threshold will not be relayed.

For example, each message in a node network 9 may contain a TTL field and the TTL field indicates how the message should be relayed as well as providing some information about the history of the message in the node network 9. The table (Table I) below illustrates an embodiment.

TABLE I

| TTL VALUE | Relay Direction | Historical Implication |
|---|---|---|
| 0 | Do no relay | Message cannot be relayed and the sender of the message is the originator |
| 1 | Do not relay | Message has been relayed in the past but cannot be relayed further |
| 2-127 | Relay | Message should be relayed |

In another example, in one embodiment, a message may be initialized with a TTL of 3 and the system may be configured to not relay the message if the TL reaches below 1. Thus, such a message can be received at a node 10A with a TTL of 3, and next relayed to a node 10B with a TTL of 2, and next relayed to a node 10C with a TTL of 1, which does NOT relay to a node 10D with a TTL of 0. Since the TTL is 1 (threshold for relaying) at the node 10C, it will not be forwarded to any other node.

Accordingly, one proposed embodiment is based on using messages with TTL=0 to determine the originating node. Both navigation and tracking applications may be based on same underlying concept. A sender publishes mesh message with TTL=0 with some additional details. The message is received by all mesh nodes (of same network) in direct range of the sender node. Because TTL=0 for the received message, receiver node can establish that sender has originated this message (not relayed this message).

In embodiments wherein nodes emit messages initialized with TTL=0, messages are only received by nodes in the range of the initial signal. As mentioned, this information can be used to establish the originator of the message. And, it also prevents messages from being distributed throughout the node network limiting any impact on the node network.

In some embodiments, a tracking device may emit a tracking signal or beacon signal. This signal may also be initialized with TTL=0. In such embodiments, receiving nodes will not transmit the beacon signal. Receiving nodes may also determine that they are the original receptor of the message by the TTL value.

When receiving locational signals with a TTL=0 value, receiving nodes can determine that they are in range of the tracking device. Similarly, a navigation device can determine that it is in the range of a node when it receives a locational signal from a respective node with a TTL value=0. Only nodes in the vicinity of the tracking device will receive the signal because they will not be retransmitted through the network. And, this information can be used to follow the path of the tracking device through the node network. In embodiments, the receiving node stores this information in its database for future use. This information need not be communicated instantaneously.

For navigation applications, a navigation device, which has received a signal from a node, may apply a navigational algorithm for human based understanding of current location or path to be followed to a final destination. Navigation, tracking and combinational embodiments of the present invention are described further below.

FIG. 2 illustrates an embodiment of a navigation device 200 that may be used for navigational applications in a node network. In various embodiments, the navigation device 200 comprises a receiver 201 with an antenna 202 and receiver circuit 204. In some embodiments, the navigation device comprises a user interface 206, a processor 208, and memory 210 comprising instructions to be executed in the processor 208.

In various embodiments, the receiver 201 is configured to receive a locational signal from a node network 9 (shown in FIG. 1). And, the receiver 201 is in communication with the processor 208. In various embodiments these various components can take any variety of forms known in the art.

In some embodiments, the navigation device 200 may comprise a mobile phone, smart phone, tablet, laptop computer, watch, or other device with an application to run a navigation program. In other embodiments, the navigation device 200 may comprise a dedicated navigation device for use in a specific node network of type of node network. In some embodiments, the navigation device 200 may also function as a node of the plurality of nodes 10 of the node network 9.

The navigation device 200 (or the program being executed) may be configured to operate along with a cloud based program and information received from the node network 9 to provide navigation to the user.

FIG. 3 illustrates an embodiment of a navigation device 200 in a node network 9. FIG. 3 depicts an enlarged portion of the node network 9 and physical space 20 depicted in FIG. 1. The node network 9 in FIG. 3 may comprise any of the embodiments of the node network 9 in FIG. 1.

Returning to FIG. 3, in various embodiments, the navigation device 200 receives a locational signal 302A identifying an emitting node 302 of the node network 9. The emitting node 302 may take any embodiment of node of the plurality of nodes 10 described with reference to FIG. 1. In some embodiments, the locational signal 302A is emitted by the emitting node 302 only when the navigation device 200 is in a range of the emitting node 302.

The navigation device 200 may comprise a memory 210 (from FIG. 2) storing a program and a processor 208 (from FIG. 2). The processor 208 of the navigation device 200 may be in communication with the receiver 201 of the navigation device 200. The processor 208 of the navigation device 200, in various embodiments, is configured to execute the program to: calculate a position of the navigation device 200 in the physical space 20 from the identity of the emitting node 302 and a known mapping of the node network 9 in the physical space 20. The program when executed by the processor 208 determines a routing instruction from the position of the navigation device 200 to a destination 308 based on the position of the navigation device 200, and updates the position of the navigation device 200 and the routing instruction as the navigation device 200 moves through the physical space 20.

In various embodiments, a user of the navigation device 200 may select a destination 308 for navigation. The destination 308 may comprise locations within the physical space 20 such as a store in a mall or a terminal in an airport. The destination 308 may also be provided to the navigation device 200 instead of being received from a user. In various embodiments, the destination 308 may comprise a node of the node network 9. In various embodiments, the destination 308 may comprise a device being tracked through the physical space 20. And, in some embodiments, the destination 308 may comprise a location or coordinates in the physical space 20.

In various embodiments, the processor 208 has access to the mapping of the physical space 20. In various embodiments, the known mapping may be stored in the memory 210 of the navigation device 200. In such embodiments, the known mapping may be configured to be updated to reflect changes in the node network 9 such as node movement, or nodes being added to or removed from the node network 9. In some embodiments, updates may occur when the navigation device is connected to a cloud network. In some embodiments, the processor 208 may access a known mapping that is not stored on the navigation device 200. The known mapping may be stored in a data cloud accessible by the navigation device or a central memory. The known mapping may be updated periodically in some embodiments or, in real time. In some embodiments, the navigation device 200 may be configured to connect to a network outside the node network 9. In some embodiments, the navigation device 200 may not be capable of connecting to other networks.

In some embodiments, the locational signal 302A may identify node a 302 only by the position of the emitting node 302. The locational signal 302A may comprise data that directly identifies the position of emitting node 302, such as coordinates, or data that can be used to derive the location of the emitting node 302. In various embodiments the node may be identified by a Bluetooth Device Address, Universal Unique Identifier, MAC ID, or another manner for uniquely identifying the nodes 10 of the node network 9. In various embodiments, coordinates of the node may comprise longitudinal/latitudinal coordinates, coordinates designed for the physical space 20, or other form known in the art. The locational signal 302A may comprise information that identifies the level of the physical space 20 where the emitting node 302 is located, the room, or other locational characteristic. The physical space 20 may be mapped to zones and the locational signal 302A may identify the zone where the emitting node 302 is located. In various embodiments, each zone may correspond to a level or room or other space. The location signal 302A may also the include relative location of a node so as to determine the surroundings and/or meta information such as other related information.

In some embodiments, the locational signal 302A may comprise a TTL value. The TTL value may be set to zero. In various embodiments, the node network 9 will not relay locational signal 302A because it has a TTL value set to 0. In such embodiments, any node or device, for example, navigation device 200, that receives the locational signal 302A may be able to determine from the TTL value of 0 that the locational signal 302A originated at the emitting node 302. In this way, the node network may prevent the locational signal of the plurality 302A from being relayed by the plurality of nodes 10 when the locational signal comprises a TL value set to 0. In some embodiments, the navigation device 200 may be configured so that only locational signals comprising a TTL value of 0 are received by the receiver 201. In some embodiments, the program executed by the processor 208 may only consider locational signals that comprise a TTL value set to 0 to determine the location of the navigation device 200.

In some embodiments, the routing instructions may comprise a sequence of instructions. In some embodiments, the user interface 206 of the navigation device 200 is in communication with the processor 208 and configured to provide the routing instruction. In various embodiments, routing instruction may be provided by visual, audio, tactile means, or other means.

In some embodiments, at least one of the nodes of the node network 9 is located indoors. In some embodiments, all the nodes of the node network 9 may be indoors. And, in some embodiments, some of the nodes of the node network 9 may be indoors and some may be outdoors.

In some embodiments, each node of the node network 9 emits a locational signal that identifies the node. For example, the first locational signal 302A received by the receiver 201 of the navigation device 200 comprises the locational signal emitted by the first emitting node 302. Second and third locational signals 304A and 306A are emitted from second and third emitting nodes 304 and 306 respectively.

Although only the second and the third locational signals 304A and 306A are referenced herein, in embodiments each node of the plurality of nodes 10 may emit locational signals. Other locational signals may comprise any embodiment of the second and the third locational signals 304A, 306A described. In some embodiments, some nodes of plurality of nodes 10 may emit locational signals while other nodes may not.

In some embodiments, the second and the third locational signal 304A and 306A of each node comprises data indicating the position of the second emitting node 304 and the third emitting node 306 in the physical space 20 that originated the locational signal 304A and 306A. The identifying second and the third location signals 304A, 306A may comprise any embodiment of the first locational signal 302A. In some cases, all the identifying locations signals of the node network 9 may have the same communication range. However, in some embodiments, different locational signals may have different communication ranges.

The receiver 201 of the navigation device 200 may be configured to receive additional second and the third locational signals 304A, 306A and the position of the navigation device 200 may be further calculated from the identities of the second and the third emitting nodes 304, 306 identified by the additional second and the third locational signals 304A, 306A.

As depicted in FIG. 3, the navigation device 200 is located within the range of the first, the second, and the third locational signals 302A, 304A, and 306A. Being in range of these signals, the receiver 201 of the navigation device may receive each of the first, the second, and the third locational signals 302A, 304A, and 306A. The navigation device 200 may also receive locational signals from any other node of the node network 9 when it is in the range of the node.

Having received the first, the second, and the third locational signals 302A, 304A, 306A that respectively identify the first, second, third emitting nodes 302, 304, 306 where they originated, the processor 208 of the navigation device 200 can run a program stored in its memory 210 to determine where the navigation device 200 is in the physical space. In various embodiments, this can be accomplished in a variety of ways.

In some embodiments, the known mapping may divide the physical space 20 into areas so that each area in the physical space 20 is identifiable by the locational signals that overlap in that area. The program executed by the processor 208 may compare the locational signals received by the navigation device 200 with the known mapping and determine which area the navigation device is located. For example, in FIG. 3, the first, the second, and the third locational signals 302A, 304A, and 306A overlap at the area 312. When the processor 208 recognizes that these three signals have been received by the navigation device 200, it can determine that the navigation device 200 is located in the area 312. In some embodiments, the first, the second, and the third locational signals 302A, 304A, and 306A may just identify the first, second, third emitting nodes 302, 304, 306 by their position in the physical space 20. The position of the first, second, third emitting nodes 302, 304, 306 of plurality of nodes 10 may be defined by coordinates or other markers. As will be appreciated, the navigation device 200 may be configured to receive a large number of locational signals. This may improve the accuracy and reliability of the navigation. In embodiments each area may correspond to a space wherein an unique combination of locational signals overlap.

In some embodiments, the navigation device 200 may be able detect the signal strength of the first, second, third locational signals 302A, 304A, 306A received by the navigation device. The program executed by the processor 208 may input the signal strengths of the first, second, third locational signals 302A, 304A, 306A into a multilateration algorithm to determine the position of the navigation device 200 in the physical space 20. The multilateration algorithm, in various embodiments, may also use the known mapping of the corresponding first, second, third emitting nodes 302, 304, 306 to determine the position of the navigation device 200.

In some embodiments, the navigation device 200, may be configured to detect the Angle of Arrival of the first, second, third locational signals 302A, 304A, 306A received at the navigation device 200. The program executed by the processor may input the Angle of Arrival into a triangulation algorithm to calculate the position of the navigation device 200 in the physical space 20. The triangulation algorithm, in various embodiments, may use the known mapping of the corresponding first, second, third emitting nodes 302, 304, 306 to determine the position of the navigation device. The different ways to determine the location of the navigation device may also be used in various combinations with each other, in some embodiments, to improve accuracy.

In some embodiments, the receiver 201 may comprise an array of antennas.

In some embodiments, the nodes of the plurality of nodes 10 continuously emit (broadcast) the first, the second, and the third locational signals 302A, 304A, and 306A. As the navigation devices passes in and out of the ranges of different locational signals, the position of the navigation device 200 can be updated accordingly. In some embodiments, updates may occur in real time. In other embodiments updates may occur periodically. In some embodiments, updates may be triggered when the navigation device 200 passes out of the range of a locational signal or into the range of a locational signal. In some embodiments, updates may be directed by a user.

Referring to FIGS. 1, 2, and 3, embodiments of a navigation system 300 comprises a node network 9 comprising a plurality of nodes 10 distributed throughout a physical space 20, wherein the plurality of nodes 10 is configured to emit a plurality of first, second, third locational signals 302A, 304A, 306A from a plurality of first, second, third emitting nodes 302, 304, 306, and wherein the plurality of first, second, third locational signals 302A, 304A, 306A identify the plurality of first, second, third emitting nodes 302, 304, 306.

In various embodiments, the navigation system 300 further comprises a mapping of the physical space 20 comprising the locations of the plurality of nodes 10. The navigation system 300 may further comprise the navigation device 200 comprising a receiver 201 configured to receive a locational signal 302A emitted by a first emitting node 302 of the plurality of nodes 10 in a communication range of the navigation device 200; a memory 210 storing a program; and a processor 208 in communication with the receiver 201 and configured to execute the program to access the mapping of the physical space 20, calculate a position of the navigation device 200 in the physical space 20 from the first locational signal 302A received by the navigation device 200, and determine a routing instruction from the position of the navigation device 200 to a destination 308 based on the position of the navigation device 200 and the mapping of the physical space 20.

In some embodiments each node of the plurality of nodes 10 of the node network 9 emit a first, second, and third locational signal 302A, 304A, 306A that identifies the first, the second, and the third emitting node 302, 304, 306 from which it was emitted, and wherein the first locational signal 302A received by the receiver 201 comprises the first locational signal 302A emitted by the first emitting node 302.

In some embodiments, the first, the second, and the third locational signal 302A, 304A, 306A of each of the first, the second, and the third emitting nodes 302, 304, 306 comprises data indicating the position of the corresponding first, second, and third emitting nodes 302, 304, 306 from which it was emitted in the physical space 20.

In some embodiments, the receiver 201 is configured to receive the second and the third locational signals 304A, 306A in addition to the first locational signal 302A. And, wherein the position of the navigation device 200 is further calculated from the identities of the second and the third emitting nodes 304, 306 identified by the additional second, third locational signals 304A, 306A.

In some embodiments, the first, second, third emitting nodes 302, 304, 306, of the node network 9 continuously emit first, second, third locational signals 302A, 304a, and 306A.

In addition to navigational applications, embodiments of the invention of this disclosure may also allow tracking applications.

FIG. 4 of the present application illustrates an embodiment of a tracking device 400. The tracking device 400 may comprise a transmitter 403 with an antenna 402 to transmit a beacon signal that identifies the tracking device 400. The tracking device may be a wearable device that may periodically send message or beacon signal to be picked up by nearby fixed nodes configurable to process such messages. Fixed nodes may store this information (neighbor information) in its database which can be shared if required.

In some embodiments, the tracking device 400 may comprise a mobile phone, tablet, laptop, smart appliance, or node 10 of a node network 9. The previously described navigation device 200, in some embodiments may also comprise a tracking device 400. In some embodiments, the tracking device 400 may comprise a processor 406 and a memory 408 in communication with the memory. The memory 408 may comprise a program to be executed in the processor 406.

FIG. 5 of the present application illustrates an embodiment of a tracking system 500. Tracking device 400 is disposed at a position in the physical space 20. The tracking system 500 further comprises a node network 509 comprising a plurality of nodes 510. In some embodiments, the node network 509 may comprise the node network 9 of FIGS. 1 and 3. And, the node network 509 may comprise any embodiment of the node network 9. For example, the node network 509 may comprise a mesh network in some embodiments. The node network 509 may also comprise a Bluetooth Mesh network or other node networks known in the art. The plurality of nodes 510 may comprise the plurality of nodes 10 of FIGS. 1 and 3 and may comprise any embodiment of the plurality of nodes 10.

As depicted in FIG. 5, the tracking device 400 may transmit a beacon signal 400A. In some embodiments, the plurality of nodes 510 is configured to receive the beacon signal 400A when in a communication range of the tracking device 400. For example, in the embodiment depicted in FIG. 5, nodes 514, 514A, 514B and 514C are in the range of the beacon signal 400A. Being in the communication range, these nodes 514, 514A, 514B and 514C may receive the beacon signal 400A.

In some embodiments, the beacon signal 400A may be initialized with a TTL value of 0. This will prevent the beacon signal 400A from being relayed through the node network 509 after it is received by a node of the plurality of nodes 510. And, receiving nodes, such as 514, 514A, 514B and 514C in the embodiment depicted in FIG. 5, can determine that the tracking device 400 originated the beacon signal 400A because the beacon signal has a TTL value set to 0.

The tracking system 500 may further comprise a mapping of the physical space 20. The mapping may be in a digital form in some embodiments. In some embodiments the mapping may comprise a database of the plurality of nodes 510 and their coordinates. The mapping may be comprise any embodiments of the known mapping of the navigation system and may be updated in any of the same ways as the known mapping of the navigation system.

In some embodiments, the tracking system 500 may further comprise a memory 518 storing a program; and a processor 520 in communication with the node network 509 and the memory 518, the processor 520 being configured to execute the program to: identify the position of the tracking device 400 by retrieving data transmissions from the plurality of nodes 510 that indicate when the nodes of the plurality of nodes 510 are in the range of the tracking device 400. Some of the processing may be performed locally while some of the processing may be performed in the cloud, accordingly, the processor 520 and the memory 518 may be local and/or in the cloud.

As an example, in some embodiments, like depicted in FIG. 5, nodes 514, 514A, 514B and 514C in the range of tracking device 400 may receive the beacon signal 400A. The processor 520 can execute a program to retrieve this information from the node network 9. Having determined that the tracking device 400 is in the range of nodes as 514, 514A, 514B and 514C, the processor can then identify the location of the tracking device 400 in the physical space.

In various embodiments, the position of the tracking device can be accomplished in a variety of ways. In some embodiments, the combination of nodes in the range of the tracking device may be corresponded to an area in the physical space based on the positions of the known positions of the nodes in range of the tracking device 400. This could be accomplished with a lookup table. In some embodiments, the location of the tracking device may also be determined geometrically based on the location of the nodes that are in range of the navigation device.

In some embodiments, the mapping may divide the physical space 20 into areas so that each area in the physical space 20 is identifiable by the nodes in the area that are in a range of the area that corresponds to the communication range of the tracking device 400. After retrieving data transmissions from the nodes that indicate when the nodes are in the range of the tracking device, this information can be compared with the mapping to determine the area where the tracking device is located. In embodiments, each area may correspond to a space wherein an unique combination of nodes is in the communication range of the area.

For example, in FIG. 5, nodes 514, 514A, 514B, and 514C are in the area 517. If the program retrieves data indicating that nodes 514, 514A, 514B, and 514C are in the communication range of the tracking device 400, the program can reference the mapping and determine the tracking device is in the area 517.

In some embodiments, the nodes 510 may be configured to detect the signal strength of the beacon signal 400A when it is received. The signal strength may vary at each node where the signal beacon is received, for example, nodes 514, 514A, 514B, and 514C. The program executed by the processor 520 may input the signal strengths received at the nodes 514, 514A, 514B, and 514C into a multilateration algorithm to determine the position of the tracking device 400 in the physical space 20. The multilateration algorithm, in various embodiments, may also use the known mapping of the nodes 514, 514A, 514B, and 514C in range of the tracking device 400 to determine the position of the tracking device 400.

In some embodiments, the nodes 510, may be configured to detect the Angle of Arrival of the beacon signal at each node in range of the tracking device, for example, nodes 514, 514A, 514B, and 514C in FIG. 5. The program executed by the processor may input the Angle of Arrival data for each node 514, 514A, 514B, and 514C in range of the tracking device 400 into a triangulation algorithm to calculate the position of the tracking device 400 in the physical space 20. The triangulation algorithm, in various embodiments, may use the known mapping of the nodes 514, 514A, 514B, and 514C in range of the tracking device 400 to determine the position of the tracking device 400. The different ways to determine the location of the tracking device may also be used in various combinations with each other, in some embodiments, to improve accuracy.

In some embodiments, the processor 520 may be in wireless communication with the node network 509.

In some embodiments, the tracking device 400 is continuously emitting a beacon signal 400A and it location can be determined in real time as it moves through the network. In some embodiments, the tracking device 400 may emit a beacon signal 400A periodically. In some embodiments, the tracking device 400 may emit a beacon signal 400A at a time determined by a user.

It will be appreciated that tracking device 400 may be added to almost any other electronic device. Tracking devices may comprise wearable bands or buttons that that people may transport through a space. Nodes of the node network 509 may be configured with tracking devices so their positions can be updated in the mapping. Tracking devices could be attached to shopping carts or other equipment to track down missing items or inventory.

In some embodiments, two or more nodes of the plurality of nodes 510 comprise relay nodes 515, 522 each relay node 515, 522 being configured to relay data transmissions to and from the other relay nodes. In FIG. 5, nodes 514 and 515 may comprise relay nodes. Additional nodes in the node network 509 may comprise relay nodes. Power consumption may be limited by utilizing a node network 9 wherein only some of the nodes are relay nodes. In some embodiments, every node of the node network 509 may comprise a relay node.

In some embodiments, one or more nodes of the plurality of nodes comprise memory nodes 514. Some nodes may be configured to be a relay node and a memory node. In some embodiments each memory node 514 may be configured to store a historical data set identifying time periods when the memory node 514 is in the range of the tracking device 400. This data can be retrieved by the processor 520 via the node network and the processor can execute a program to track the path 502 of the navigation device through the physical space 20 over time.

In some embodiments, data transmissions from the nodes of the plurality of nodes 510 comprise the historical data sets of the one or more memory nodes 514 and the processor 520 is configured to execute the program to identify the position of the tracking device 400 at one or more past times by retrieving the data transmissions from the nodes of the plurality of nodes 510. In such embodiments, the tracking device 400 may be tracked through the physical space 20. In some embodiments, memory nodes 514 may store historical data sets indefinitely so they may be retrieved whenever needed. And, in some embodiments the path 502 of the tracking device may be determined as a function of time based on the historical data sets.

In some embodiments, memory node 514 also stores information from nodes 514A, 514B, and 514C that are neighbors with memory node 514. For example, in various embodiments, information stored in memory node 514 indicates when nodes 514A, 514B and 514C are in range of the tracking device. In some embodiments, neighboring nodes comprise nodes 514A, 514B, and 514C in a range of the memory node 514.

In some embodiments, the historical data set of each memory node 514 identifies time periods when one or more nodes, for example, neighboring nodes 514A, 514B, 514C, of the plurality of nodes 510 that are in a vicinity of the memory node 514 are in range of the tracking device 400.

In some embodiments the tracking system 500 may be combined with the navigation system 300. In some embodiments the tracking device 400 may further comprise a receiver 201 configured to receive a locational signal 302A emitted by a emitting node 302 of the plurality of nodes 10. In some embodiments the plurality of nodes 510 are configured to emit locational signals 302A and also configured receive beacon signals 400A. And the tracking device 400 is configured to receive locational signals 302A and emit beacon signals 400A.

The tracking device 400 may further comprise a memory 210 storing a program and a processor 208 in communication with the receiver 201 and configured to execute the navigation program to: access the mapping of the physical space 20, calculate a position of the tracking device 400 in the physical space 20 from the locational signal 302A received by the tracking device 400, and determine a routing instruction from the position of the tracking device 400 to a destination 308 based on the position of the tracking device 400 and the mapping of the physical space 20.

In some embodiments, the navigation device 200 may further comprise a transmitter 403 configured to transmit a positional signal identifying the position of the navigation device 200 to the node network 9. In some embodiments the positional signal comprises the beacon signal 400A. In embodiments, the nodes 10 of the node network 9 are configured to receive the positional signal when in a reception range of the navigation device 200.

In some embodiments the navigation system 300 further comprises a tracking memory 518 storing a tracking program and a tracking processor 520 in communication with the node network 9 and configured to execute the tracking program to identify the position of the navigational device 200 by retrieving data transmissions from the plurality of nodes 10 that indicate when the nodes of the plurality of nodes 10 are in the range of the navigational device 200.

Based on above, in various embodiments wherein the node network 509 of the tracking system comprises a BlueTooth Mesh network, the memory nodes 514 may store the following information about nodes 514A, 514B, 514C that are neighbors: BlueTooth Device address of nodes 514A, 514B, 514C that are neighbors, whether the neighbor is a provisioned or unprovisioned device, the Universal Unique Identifier of unprovisioned neighbors, the network address of provisioned neighbor nodes (updated only if message received has a TTL=0), the Received Signal Strength Indicator of the last message received from or by a neighbor node, and Angle of Arrival of the last message received from or by a neighbor node.

Advantageously, in accordance with embodiments of the present invention, existing indoor network and nodes may be able to be updated to support the features of this invention. No additional hardware may be needed but for a firmware upgrade. Accordingly, embodiments of the present invention are cost effective. In addition, in embodiments comprising Bluetooth Mesh networks with TTL signals initialized at 0, there is no significant impact on the whole mesh network, as involved messages are generated with TTL=0 and therefore strictly confined to the neighbor nodes (no relaying overhead). As it works on existing Bluetooth Mesh network, if and when required, information can be requested from anywhere (control room) from participating nodes. This is useful when the system needs to be used for locating a moving node or human and asset in the network.

Figure 6:
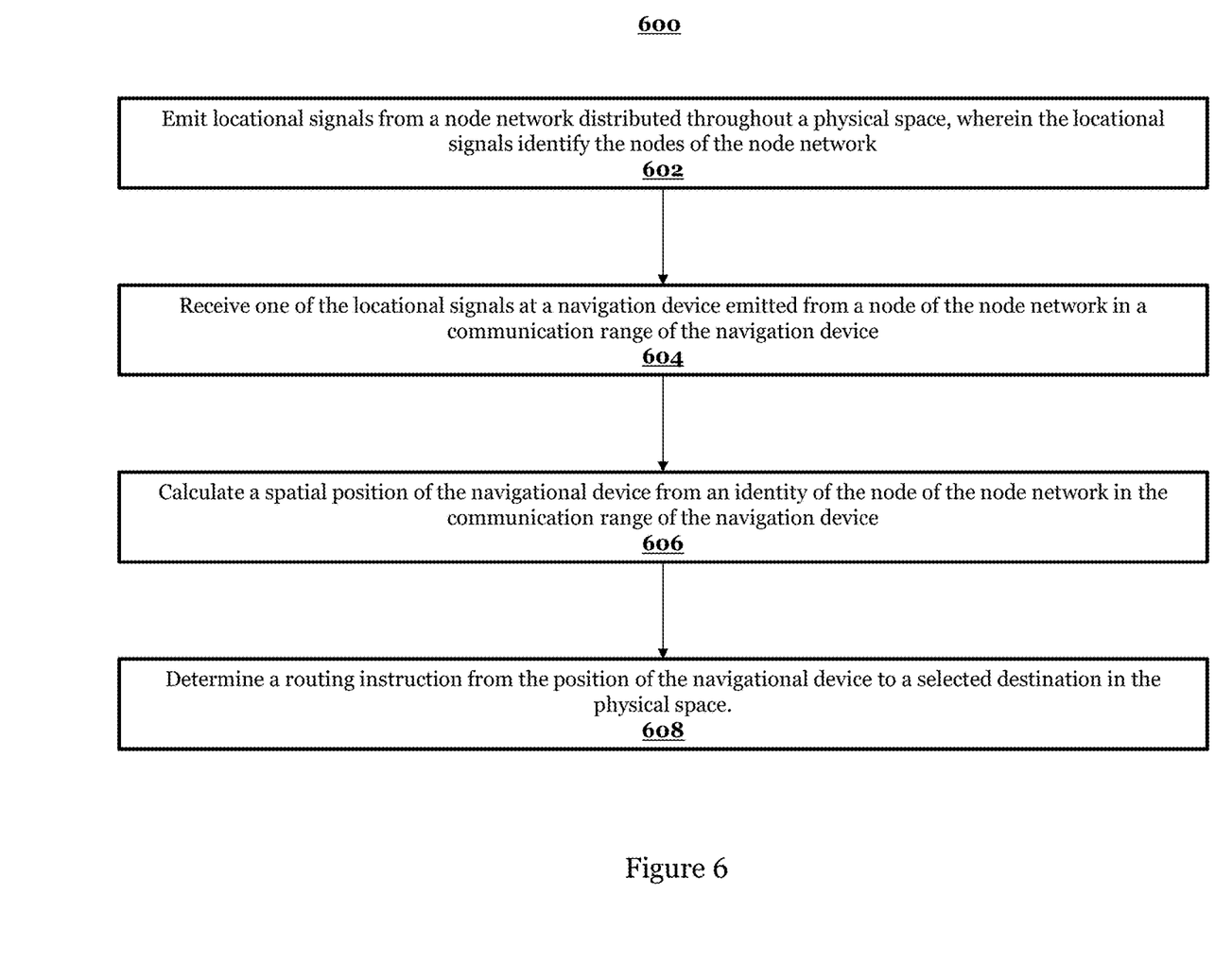
FIG. 6 illustrates a block diagram of a method of navigation.

FIG. 6 illustrates a block diagram for a method 600 for navigation within a physical space comprising at step 602 emitting locational signals from a node network distributed throughout a physical space, wherein the locational signals identify the nodes of the node network. The method 600 further comprises at step 604 receiving one of the locational signals at a navigation device emitted from a node of the node network in a communication range of the navigation device; and at step 606 calculating a spatial position of the navigational device from an identity of the node of the node network in the communication range of the navigation device. At step 608, the method 600 comprises determining a routing instruction from the position of the navigational device to a selected destination in the physical space.

In some embodiments, the method 600 further comprises providing the routing instructions through an interface of the navigational device.

In some embodiments, the method 600 further comprises updating the spatial position of the navigation device and the routing instruction as the navigation device moves through the physical space.

In some embodiments of the method 600, the node network comprises a mesh network. In some embodiments of the method 600, the locational signals comprise a time to live values that are set to zero. In some embodiments, the navigation device may determine that it is in range of the node that emitted a locational signal when it receives a locational signal with a TTL value=0. And, in some embodiments of the method 600, at least one of the nodes of the node network is located indoors.

Figure 7:
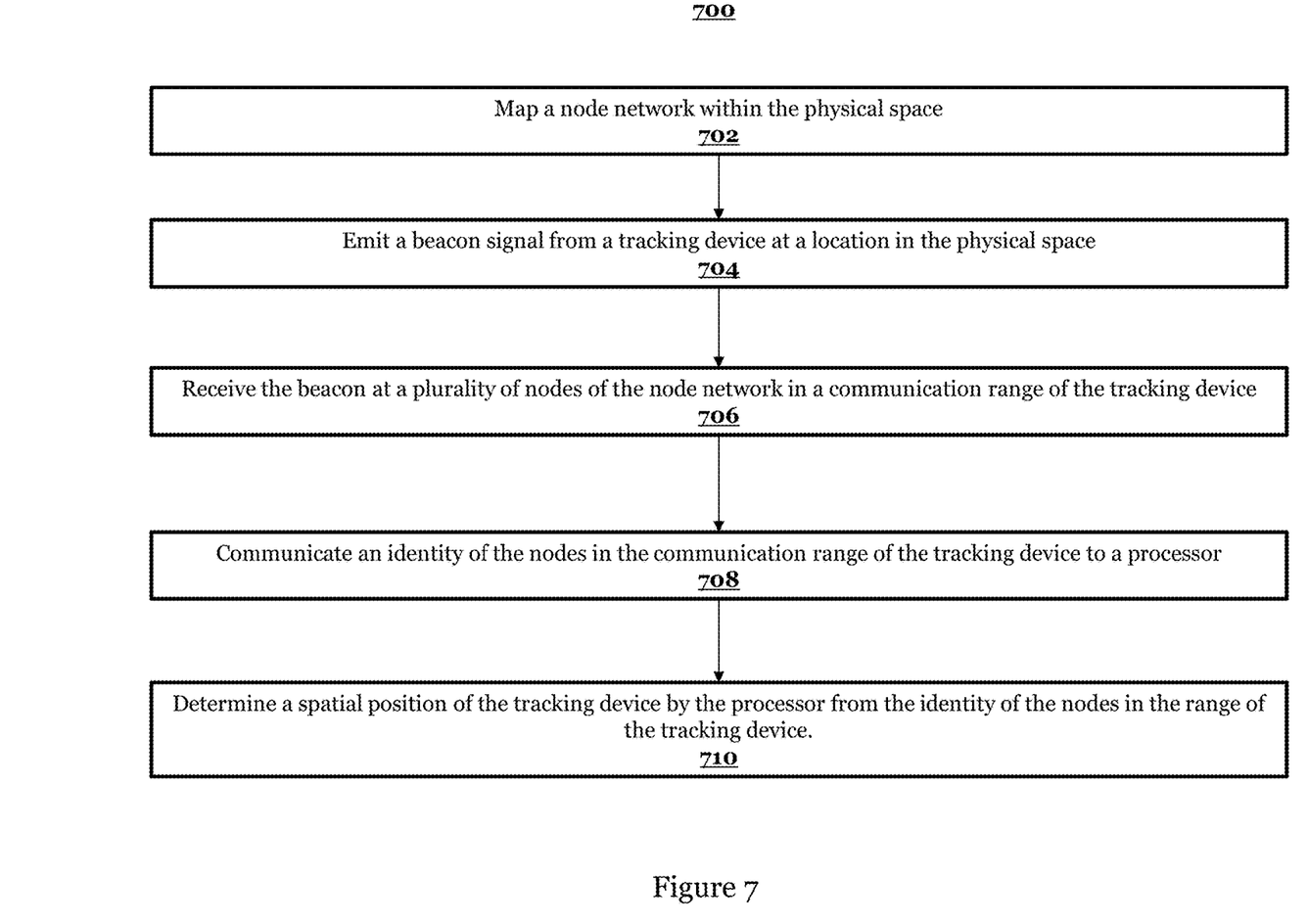
FIG. 7 illustrates a block diagram of method of tracking.

FIG. 7 illustrates a block diagram for a method 700 for tracking a device within a physical space comprising at step 702 mapping a node network within the physical space; at step 704 emitting a beacon signal from a tracking device at a location in the physical space; at step 706 receiving the beacon at a plurality of nodes of the node network in a communication range of the tracking device; at step 708 communicating an identity of the nodes in the communication range of the tracking device to a processor; and at step 710 determining a spatial position of the tracking device by the processor from the identity of the nodes in the range of the tracking device.

In some embodiments, the method 700 further comprises updating the spatial position of the tracking device as the tracking device mover through the physical space.

In some embodiments of the method 700, the node network comprises a mesh network.

In some embodiments of the method 700, the beacon signal comprises a time to live value that is set to zero. In some embodiments, it may be determines that a node of the plurality of nodes is in the communication range of a tracking device when the receiving node it receives a beacon signal with a TTL value=0.

In some embodiments of the method 700, at least one of the nodes of the node network is located indoors.

Example embodiments of the invention are summarized here. Other embodiments can also be understood from the entirety of the specification as well as the claims filed herein.

Example 1. A navigation system includes a node network that includes a plurality of nodes distributed throughout a physical space. The plurality of nodes is configured to emit a plurality of locational signals from a plurality of emitting nodes, where the plurality of locational signals identifies the plurality of nodes. The navigation system further includes a map of the physical space including the locations of the plurality of nodes. The navigation system further includes a navigation device that includes a receiver configured to receive a locational signal transmitted by a respective emitting node of the plurality of nodes in a communication range of the navigation device. The navigation device further includes a memory storing a program and a processor in communication with the receiver and configured to execute the program to access the map of the physical space, calculate a position of the navigation device in the physical space from the locational signal received by the navigation device, and determine a routing instruction from the position of the navigation device to a destination based on the position of the navigation device and the mapping of the physical space.

Example 2. The system of example 1, where the navigation device further includes a user interface in communication with the processor and configured to provide the routing instruction.

Example 3. The system of one of examples 1 or 2, where the processor is also configured to execute the program to update the position of the navigation device and the routing instruction as the navigation device moves through the physical space.

Example 4. The system of one of examples 1 to 3, where the node network includes a mesh network.

Example 5. The system of one of examples 1 to 4, where the locational signals of the plurality of locational signals includes a time to live value that is set to zero.

Example 6. The system of one of examples 1 to 5, where the node network prevents the locational signal of the plurality of locational signals from being relayed by the plurality of nodes after the locational signal is emitted.

Example 7. The system of one of examples 1 to 6, where at least one of the nodes of the node network is located indoors.

Example 8. The system of one of examples 1 to 7, where each emitting node of the node network emits a locational signal of the emitting node that identifies the emitting node, and where the locational signal received by the receiver includes the locational signal emitted by the respective emitting node.

Example 9. The system of one of examples 1 to 8, where the locational signal of each emitting node includes data indicating the position of the emitting node in the physical space.

Example 10. The system of one of examples 1 to 9, where the receiver is configured to receive additional locational signals of the plurality of locational signals and where the position of the navigation device is further calculated from the identities of the emitting nodes identified by the additional locational signals.

Example 11. The system of one of examples 1 to 10, where the position of the navigation device is only calculated from locational signals including a time to live value set to 0.

Example 12. The system of one of examples 1 to 11, where the navigation device is configured to detect an angle of arrival of the locational signal and an angle of arrival for each of the additional locational signals and where the program utilizes a triangulation algorithm to calculate the position of the navigation device based at least on the angle of arrival of the locational signal and the angle of arrival of each the additional locational signals.

Example 13. The system for one of examples 1 to 12, where the navigation device is configured to detect a signal strength of the locational signal and a signal strengths of each of the additional locational signals and where the program utilizes a multilateration algorithm to calculate the position of the navigation device based at least on the signal strength of the locational signal and the signal strengths of each of the additional locational signals.

Example 14. The system of one of examples 1 to 13, where the emitting nodes of the node network continuously emit locational signals.

Example 15. The system of one of examples 1 to 14, where the nodes of the node network are configured for node to node communication.

Example 16. The system of one of examples 1 to 15, where the navigation device further includes a transmitter configured to transmit a positional signal identifying the position of the navigation device and the nodes of the node network are configured to receive the positional signal when in a reception range of the navigation device.

Example 17. The system of one of examples 1 to 16, further including: a tracking memory storing a tracking program; and a tracking processor in communication with the node network and configured to execute the tracking program to identify the position of the navigational device by retrieving data transmissions from the plurality of nodes that indicate when the nodes of the plurality of nodes are in the range of the navigational device.

Example 18. A system for tracking a device in a physical space includes a tracking device disposed at a position in the physical space. The tracking device includes a transmitter configured to transmit a beacon signal that identifies the tracking device. The system includes a node network including a plurality of nodes, where the nodes of the plurality of nodes are configured to receive the beacon signal when in a communication range of the tracking device. The system also includes a map of the physical space including locations of the nodes of the plurality of nodes. The tracking device further includes a memory storing a program and a processor in communication with the node network and the memory. The processor is configured to execute the program to identify the position of the tracking device by retrieving data transmissions from the plurality of nodes that indicate when the nodes of the plurality of nodes are in the range of the tracking device.

Example 19. The system of example 18, where two or more nodes of the plurality of nodes include relay nodes, each relay node being configured to relay data transmissions to and from the other relay nodes.

Example 20. The system of one of examples 18 or 19, where nodes of the plurality of nodes include memory nodes, each memory node being configured to store a historical data set identifying time periods when the memory node is in the range of the tracking device.

Example 21. The system of one of examples 18 to 20, where data transmissions from the nodes of the plurality of nodes include the historical data sets of the plurality of memory nodes and the processor is configured to execute the program to identify the position of the tracking device at past times by retrieving data transmissions from the nodes of the plurality of nodes.

Example 22. The system of one of examples 18 to 21, where the historical data set of each memory node identifies time periods when nodes of the plurality of nodes that are in a vicinity of the memory node are in the communication range of the tracking device.

Example 23. The system of one of examples 18 to 22, where the node network includes a mesh network.

Example 24. The system of one of examples 18 to 23, where the beacon signal includes a time to live value that is set to zero.

Example 25. The system of one of examples 18 to 24, where the node network prevents the beacon signal from being relayed by the plurality of nodes after the beacon signal is transmitted by the tracking device.

Example 26. The system of one of examples 18 to 25, where the nodes of the plurality of nodes are configured to detect an angle of arrival of the beacon signal at each node in the communication range and where the program utilizes a triangulation algorithm to calculate the position of the tracking device based at least on the angle of arrival of the beacon signal at each node in the communication range.

Example 27. The system for one of examples 18 to 26, where the nodes of the plurality of nodes are configured to detect a signal strength of the beacon signal at each node in the communication range and where the program utilizes a multilateration algorithm to calculate the position of the tracking device based at least on the signal strength of the beacon signal at each node in the communication range.

Example 28. The system of one of examples 18 to 27, where the tracking device further includes: a receiver configured to receive a locational signal emitted by a respective emitting node of the plurality of nodes; a tracking memory storing a tracking program; and a tracking processor in communication with the receiver and configured to execute the tracking program to access the mapping of the physical space, calculate the position of the tracking device in the physical space from the locational signal received by the tracking device, and determine a routing instruction from the position of the tracking device to a destination based on the position of the tracking device and the mapping of the physical space.

Example 29. A method for navigation within a physical space includes emitting locational signals from a node network distributed throughout a physical space, where the locational signals identify the nodes of the node network. The method further includes receiving one of the locational signals at a navigation device emitted from a node of the node network in a communication range of the navigation device. The method further includes calculating a spatial position of the navigational device from an identity of the node of the node network in the communication range of the navigation device. The method further includes determining a routing instruction from the position of the navigational device to a selected destination in the physical space.

Example 30. The method of example 29, further including providing the routing instructions through an interface of the navigational device.

Example 31. The method of one of examples 29 or 30, further including updating the spatial position of the navigation device and the routing instruction as the navigation device moves through the physical space.

Example 32. The method of one of examples 29 to 31, where the node network includes a mesh network.

Example 33. The method of one of examples 29 to 32, where the locational signals include time to live values that are set to zero.

Example 34. The method of one of examples 29 to 33, where at least one of the nodes of the node network is located indoors.

Example 35. The method of one of examples 29 to 34, further including receiving additional locational signals at the navigation device and sensing an angle of arrival of the one of the locational signals and an angle of arrival of each of the additional signals, and where calculating a spatial position of the navigation device further includes triangulating the position of the navigation device at least from the angle of arrival of the one of the locational signals and the angle of arrival of each of the additional signals.

Example 36. The method of one of examples 29 to 35, further including receiving additional locational signals at the navigation device and sensing a signal strength of the one of the locational signals and sensing a signal strength of each of the additional signals and where calculating a spatial position of the navigation device further includes multilateration of the position of the navigation device at least from the signal strength of the one of the locational signals and the signal strength of each of the additional signals.

Example 37. A method for tracking a device within a physical space including: mapping a node network within the physical space; emitting a beacon signal from a tracking device at a location in the physical space; receiving the beacon signal at a plurality of nodes of the node network in a communication range of the tracking device; communicating an identity of the nodes in the communication range of the tracking device to a processor; and determining a spatial position of the tracking device by the processor from the identity of the nodes in the range of the tracking device.

Example 38. The method of example 37, further including updating the spatial position of the tracking device as the tracking device moves through the physical space.

Example 39. The method of one of examples 37 or 38, where the node network includes a mesh network.

Example 40. The method of one of examples 37 to 39, where the beacon signal includes a time to live value that is set to zero.

Example 41. The method of one of examples 37 to 40, where at least one of the nodes of the node network is located indoors.

Example 42. The method of one of examples 37 to 41, further including sensing an angle of arrival of the beacon signal at each of the plurality of nodes and where determining a spatial position of the tracking device further includes triangulating the position of the tracking device at least from the angle of arrival of the beacon signal at each of the plurality of nodes.

Example 43. The method of one of examples 37 to 42, further including sensing an signal strength of the beacon signal at each of the plurality of nodes and where determining a spatial position of the tracking device further includes multilateration of the position of the tracking device at least from the signal strength of the beacon signal at each of the plurality of nodes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A navigation system comprising:
a mesh network comprising a plurality of nodes distributed throughout a physical space, wherein the mesh network is configured to relay messages originating from any node of the plurality of nodes to any other node of the plurality of nodes neighbor to neighbor within the mesh network by inter node communication amongst the plurality of nodes within the mesh network, the plurality of nodes being configured to emit a plurality of locational signals from a plurality of emitting nodes, and wherein the plurality of locational signals identify the plurality of emitting nodes, at least one locational signal of the plurality of locational signals comprising a time to live value that is initialized at zero;
a map of the physical space comprising the locations of the plurality of emitting nodes;
a navigation device comprising:
a receiver configured to receive a locational signal transmitted by a respective emitting node of the plurality of nodes in a communication range of the navigation device;
a memory storing a program; and
a processor in communication with the receiver and configured to execute the program to
access the map of the physical space,
calculate a position of the navigation device in the physical space from the locational signal received by the navigation device, and
determine a routing instruction from the position of the navigation device to a destination based on the position of the navigation device and the map of the physical space.

2. The navigation system of claim 1, wherein the navigation device further comprises a user interface in communication with the processor and configured to provide the routing instruction.

3. The navigation system of claim 1, wherein the processor is also configured to execute the program to update the position of the navigation device and the routing instruction as the navigation device moves through the physical space.

4. The navigation system of claim 1, wherein the mesh network prevents the at least one locational signal of the plurality of locational signals from being relayed by the plurality of nodes after the at least one locational signal is emitted because the time to live value is set to zero.

5. The navigation system of claim 1, wherein each emitting node of the mesh network emits a locational signal of that emitting node that identifies that emitting node, and wherein the locational signal received by the receiver comprises the locational signal emitted by the respective emitting node.

6. The navigation system of claim 5, wherein the locational signal of each emitting node comprises data indicating the position of that emitting node in the physical space.

7. The navigation system of claim 5, wherein the receiver is configured to receive additional locational signals of the plurality of locational signals and wherein the position of the navigation device is further calculated from identities of the emitting nodes identified by the additional locational signals.

8. The navigation system of claim 7, wherein the position of the navigation device is only calculated from locational signals comprising a time to live value initialized at zero.

9. The navigation system of claim 1, wherein the navigation device further comprises a transmitter configured to transmit a positional signal identifying the position of the navigation device and the plurality of nodes are configured to receive the positional signal when in a reception range of the navigation device.

10. The navigation system of claim 1, further comprising:
a tracking memory storing a tracking program; and
a tracking processor in communication with the mesh network and configured to execute the tracking program to
identify the position of the navigational device by retrieving data transmissions from the plurality of nodes that indicate when the nodes of the plurality of nodes are in a range of the navigational device.

11. A system for tracking a device in a physical space comprising:
- a tracking device disposed at a position in the physical space, the tracking device comprising a transmitter configured to transmit a beacon signal that identifies the tracking device, the beacon signal comprising a time to live value initialized at zero;
- a mesh network comprising a plurality of nodes distributed throughout the physical space, wherein the mesh network is configured to relay messages originating from any node of the plurality of nodes to any other node of the plurality of nodes neighbor to neighbor within the mesh network by inter node communication amongst the plurality of nodes within the mesh network, the nodes of the plurality of nodes being configured to receive the beacon signal when in a communication range of the tracking device;
- a map of the physical space comprising locations of the nodes of the plurality of nodes;
- wherein the tracking device comprises
  - a memory storing a program; and
  - a processor in communication with the mesh network and the memory, the processor being configured to execute the program to identify the position of the tracking device by retrieving data transmissions from the plurality of nodes that indicate when the nodes of the plurality of nodes are in the communication range of the tracking device.

12. The system of claim 11, wherein the plurality of nodes comprises a plurality of memory nodes, each memory node being configured to store a historical data set identifying time periods when the memory node is in the communication range of the tracking device.

13. The system of claim 12, wherein data transmissions from the nodes of the plurality of nodes comprise the historical data sets of the plurality of memory nodes and the processor is configured to execute the program to identify the position of the tracking device at past times by retrieving data transmissions from the nodes of the plurality of nodes.

14. The system of claim 12, wherein the historical data set of each memory node identifies time periods when nodes of the plurality of nodes that are in a vicinity of that memory node are in the communication range of the tracking device.

15. The system of claim 11, wherein the mesh network prevents the beacon signal from being relayed by the plurality of nodes after the beacon signal is transmitted by the tracking device.

16. The system of claim 11, wherein the tracking device further comprises:
- a receiver configured to receive a locational signal emitted by a respective emitting node of the plurality of nodes;
- a tracking memory storing a tracking program; and
- a tracking processor in communication with the receiver and configured to execute the tracking program to access the map of the physical space,
  - calculate the position of the tracking device in the physical space from the locational signal received by the tracking device, and
  - determine a routing instruction from the position of the tracking device to a destination based on the position of the tracking device and the map of the physical space.

17. A method for navigation within a physical space comprising:
- emitting locational signals from a mesh network distributed throughout a physical space, the locational signals comprising time to live values initialized at zero, the mesh network comprising a plurality of nodes and being configured to relay messages originating from any node of the plurality of nodes to any other node of the plurality of nodes neighbor to neighbor within the mesh network by inter node communication amongst the plurality of nodes within the mesh network, wherein the locational signals identify the nodes of the plurality of nodes;
- receiving one of the locational signals at a navigation device emitted from a node of the of the plurality of nodes in a communication range of the navigation device;
- calculating a spatial position of the navigational device from an identity of the node of the plurality of nodes in the communication range of the navigation device, wherein the calculating comprises accessing a map of the physical space comprising the locations of the plurality of emitting nodes; and
- determining a routing instruction from the spatial position of the navigational device to a selected destination in the physical space.

18. The method of claim 17, further comprising providing the routing instruction through an interface of the navigational device.

19. The method of claim 17, further comprising updating the spatial position of the navigation device and the routing instruction as the navigation device moves through the physical space.

20. A method for tracking a device within a physical space comprising:
- mapping a mesh network within the physical space, the mesh network comprising a plurality of nodes and being configured to relay messages originating from any node of the plurality of nodes to any other node of the plurality of nodes within the mesh network by inter node communication amongst the plurality of nodes within the mesh network;
- emitting a beacon signal from a tracking device at a location in the physical space, the beacon signal comprising a time to live value initialized at zero;
- receiving the beacon signal at one or more nodes of the plurality of nodes in a communication range of the tracking device;
- communicating an identity of the one or more nodes in the communication range of the tracking device to a processor; and
- determining a spatial position of the tracking device by the processor from the identity of the one or more nodes in the communication range of the tracking device, wherein the determining comprises accessing a map of the physical space comprising the locations of the plurality of emitting nodes.

21. The method of claim 20, further comprising updating the spatial position of the tracking device as the tracking device moves through the physical space.

* * * * *